United States Patent
Morris

(10) Patent No.: US 7,464,141 B2
(45) Date of Patent: Dec. 9, 2008

(54) METHOD AND SYSTEM FOR ASSOCIATING RELATED MESSAGES OF DIFFERENT TYPES

(75) Inventor: Robert P. Morris, Raleigh, NC (US)

(73) Assignee: Scencera Technologies, LLC, Portsmouth, NH (US)

( * ) Notice: Subject to any disclaimer, the term of this patent is extended or adjusted under 35 U.S.C. 154(b) by 406 days.

(21) Appl. No.: 10/883,245

(22) Filed: Jun. 30, 2004

(65) Prior Publication Data

US 2006/0031523 A1  Feb. 9, 2006

(51) Int. Cl.
*G06F 17/00* (2006.01)

(52) U.S. Cl. .................. 709/206; 709/219; 709/245; 707/3

(58) Field of Classification Search .......... 709/206, 709/219, 227, 203, 201, 228, 220, 225, 245; 379/112, 202; 705/35, 27; 713/153; 707/3
See application file for complete search history.

(56) References Cited

U.S. PATENT DOCUMENTS

| | | | | |
|---|---|---|---|---|
| 5,333,266 | A | | 7/1994 | Boaz et al. ............... 395/200 |
| 5,884,312 | A | * | 3/1999 | Dustan et al. ............. 707/10 |
| 6,134,582 | A | * | 10/2000 | Kennedy ................. 709/206 |
| 6,266,651 | B1 | * | 7/2001 | Woolston ................. 705/27 |
| 6,404,762 | B1 | | 6/2002 | Luzeski et al. ............ 370/352 |
| 6,430,177 | B1 | | 8/2002 | Luzeski et al. ............ 370/356 |
| 6,445,694 | B1 | | 9/2002 | Swartz ................... 370/352 |
| 6,563,912 | B1 | | 5/2003 | Dorfman et al. ......... 379/88.13 |
| 6,587,871 | B1 | | 7/2003 | Schrader ................. 709/206 |
| 6,625,258 | B1 | | 9/2003 | Ram et al. ............. 379/88.13 |
| 6,633,630 | B1 | | 10/2003 | Owens et al. ........... 379/93.24 |
| 6,704,394 | B1 | | 3/2004 | Kambhatla et al. ........ 379/67.1 |
| 6,718,168 | B2 | | 4/2004 | Ala-Luukko et al. ...... 455/412.1 |
| 7,020,687 | B2 | * | 3/2006 | Mooney et al. ........... 709/206 |
| 7,032,006 | B2 | * | 4/2006 | Zhuk ..................... 709/206 |
| 2001/0007981 | A1 | * | 7/2001 | Woolston ................. 705/27 |
| 2002/0002581 | A1 | * | 1/2002 | Siddiqui ................. 709/202 |
| 2003/0056092 | A1 | * | 3/2003 | Edgett et al. ............ 713/153 |
| 2003/0131045 | A1 | * | 7/2003 | McGee et al. ............ 709/201 |
| 2004/0024880 | A1 | * | 2/2004 | Elving et al. ............ 709/227 |
| 2004/0215784 | A1 | * | 10/2004 | Qi et al. ................ 709/227 |

* cited by examiner

*Primary Examiner*—Khanh Dinh

(57) ABSTRACT

The invention provides a system and method for associating related messages of different types. The system has a message server in communication with a client device over a network. The message server receives a message from the client device. The server determines whether a former session identification (ID) was transmitted with the message. If the former session ID was not transmitted with the message, the server associates a current session ID with the message. Finally, the server stores the message, whereby a user may retrieve the message using one of the former session ID or the current session ID.

21 Claims, 5 Drawing Sheets

METHOD AND SYSTEM FOR ASSOCIATING RELATED MESSAGES OF DIFFERENT TYPES

FIELD OF THE INVENTION

The invention relates generally to communication and specifically to associating related messages of different types.

BACKGROUND OF THE INVENTION

Unified messaging technology provides mechanisms that allow voice, email, and fax messages to be managed in an integrated fashion. For example, some systems allow users to manage all their messages from one interface. Features of such systems include the ability to convert one type of message to the other. For example, a voicemail may be converted to text, a fax to email, and so on. Such systems also have ways in which a user is notified when a new message arrives, regardless of the type of message.

Email messages may be associated together as part of a chain of messages, starting with a first message and following with replies to that message. Additionally, a subject heading may list various email messages together in a search, whether the messages are actually related rather than simply sharing the same subject heading.

One disadvantage of conventional systems is that they do not associate messages received with other, related messages that have previously been received. Particularly, conventional systems do not associate related messages of different types, e.g. email, voice, fax, etc.

Accordingly, what is needed is a method and system for associating related messages of different types. The present invention addresses such a need.

BRIEF SUMMARY OF THE INVENTION

Aspects of the present invention include a system and method for associating related messages of different types by linking the messages through association to a common session identification (ID). The system has a message server in communication with a client device over a network. According to the present invention, the server receives a message from the client device and determines whether a former session identification (ID) was transmitted with the message. If the former session ID was not transmitted with the message then the server associates a current session ID with the media. Finally, the server stores the message. Each message related to the same session may be associated with the same session ID, whether the session ID is created during a current session message or was created during a previous session message.

According to the present invention, the method and system allow users to send messages and identify them as belonging together, regardless of the type of message (e.g. voicemail, fax, email, etc.). The messages may then be ordered according to when they were sent, the sequence in which they were sent, while identifying all senders and recipients. A method and system according to the present invention functions with clients using separate voice and data networks as well as a common transport network.

BRIEF DESCRIPTION OF THE SEVERAL VIEWS OF THE DRAWING(S)

DETAILED DESCRIPTION OF THE INVENTION

The invention relates generally to communications and specifically to associating related media. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
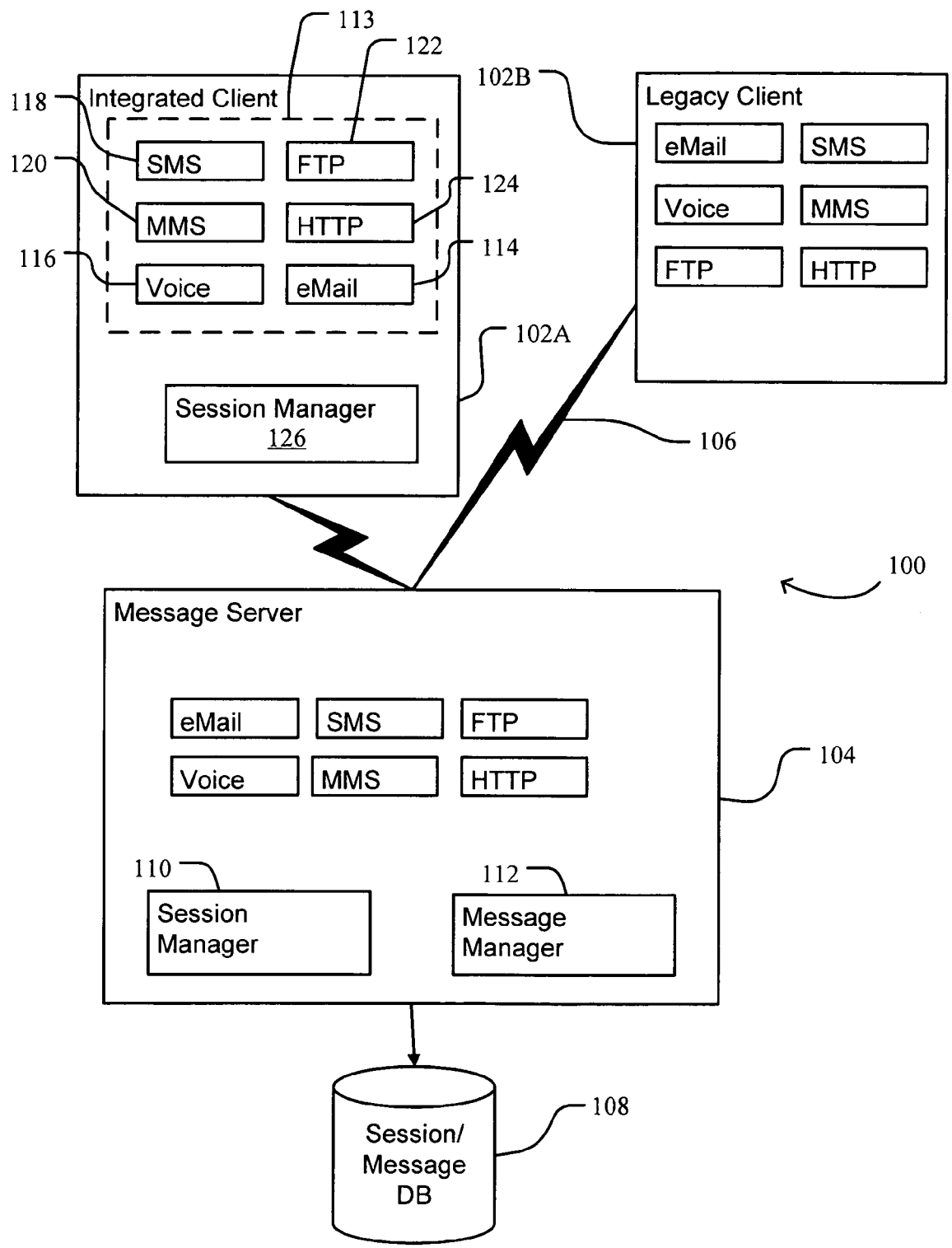
FIG. 1 is a block diagram of one embodiment of a system for associating messages with a client device, a legacy client and a message server.

FIG. 1 is a block diagram of one embodiment of system 100 for associating related messages. System 100 includes integrated client device 102A, legacy client device 102B (collectively referred to as 102) and message server 104. Client device 102 may include, for example, cell phones, digital cameras, personal digital assistants (PDAs), personal computers, telephones, and so on. Each client device 102 need not be capable or transmitting or receiving all messages. For example, integrated client device 102A includes programmable devices that may be capable of transmitting most types of messages, while legacy client 102B, for example a telephone, may only be capable of transmitting voice messages. One difference between integrated client 102A and legacy client 102B is that integrated client 102A has a session manager (see below). Though not illustrated in FIG. 1, integrated client device 102A may have a processor, memory, and other components common to integrated circuits.

Client device 102 is connected to message server 104 through network 106. Examples of network 106 include a wireless connection (e.g. Bluetooth, GSM, etc.), an intranet, the Internet, and a combination of different networks.

Clients transmit to recipients different types of messages 113 including, for example, email 114, voice 116, short messaging service (SMS) 118, multimedia messaging service (MMS) 120, file transfer protocol (FTP) 122 and hyper-text transfer protocol (HTTP) 124. The 'message' of HTTP 124, for example, could be an HTTP Post message transferring a message and/or a file to a server. The recipient could retrieve the file through a corresponding link to an HTTP GET command. Voice 116 includes multi-party voice conversations and voice messages such as voice mail.

Message server 104 is connected to storage 108, which may be physically a part of message server 104 or remotely located. Message server 104 includes session manager 110 and message manager 112. Session manager 110 assigns and tracks sessions while message manager 112 stores messages with session identification (ID) in storage 108. A session consists of one or more associated messages. Each session has a session ID. Each message in a session is known as a session message. A session ID applied to two or more messages represents parameters used to link the messages. One common reason for linking messages is that they cover the same subject or related subjects. Each message does not necessarily create a new session ID if a user decides the message should belong to the parameters of a former session, i.e. the user may apply the session ID from the former session to the new message. Typically the user does not directly select a session ID, rather the user would select a former session under which to save a message, and the system would apply the session ID for the former session. One example of selecting a former session includes a user deciding to reply to a voice mail with an email. By selecting 'reply' to the voice mail, the same session ID associated with the voice mail is attached to the email.

A session ID includes all messages associated to it by a user. For example, a session is begun with current session ID 'A' applied to email 114 and voice 116 message. Later, SMS 118 message is also associated with session ID 'A', which is now from a 'former' session. Then, a new session with session ID 'B' begins for HTTP 124 message, wherein the new session is now the current session. Finally, FTP 122 communication is sent with session ID 'A' as a former session, using the same session ID as for email 114, voice 116 and SMS 118. Messages may be added to sessions A and B again or not, at the discretion of a user. Generally, a current session ID is created for a session around the time of message creation, transmission, or reception, while a former session ID was created in the past for a previously created message and is being reused for new messages that relate to the old messages, in whatever manner a user may wish to relate them.

Figure 2:
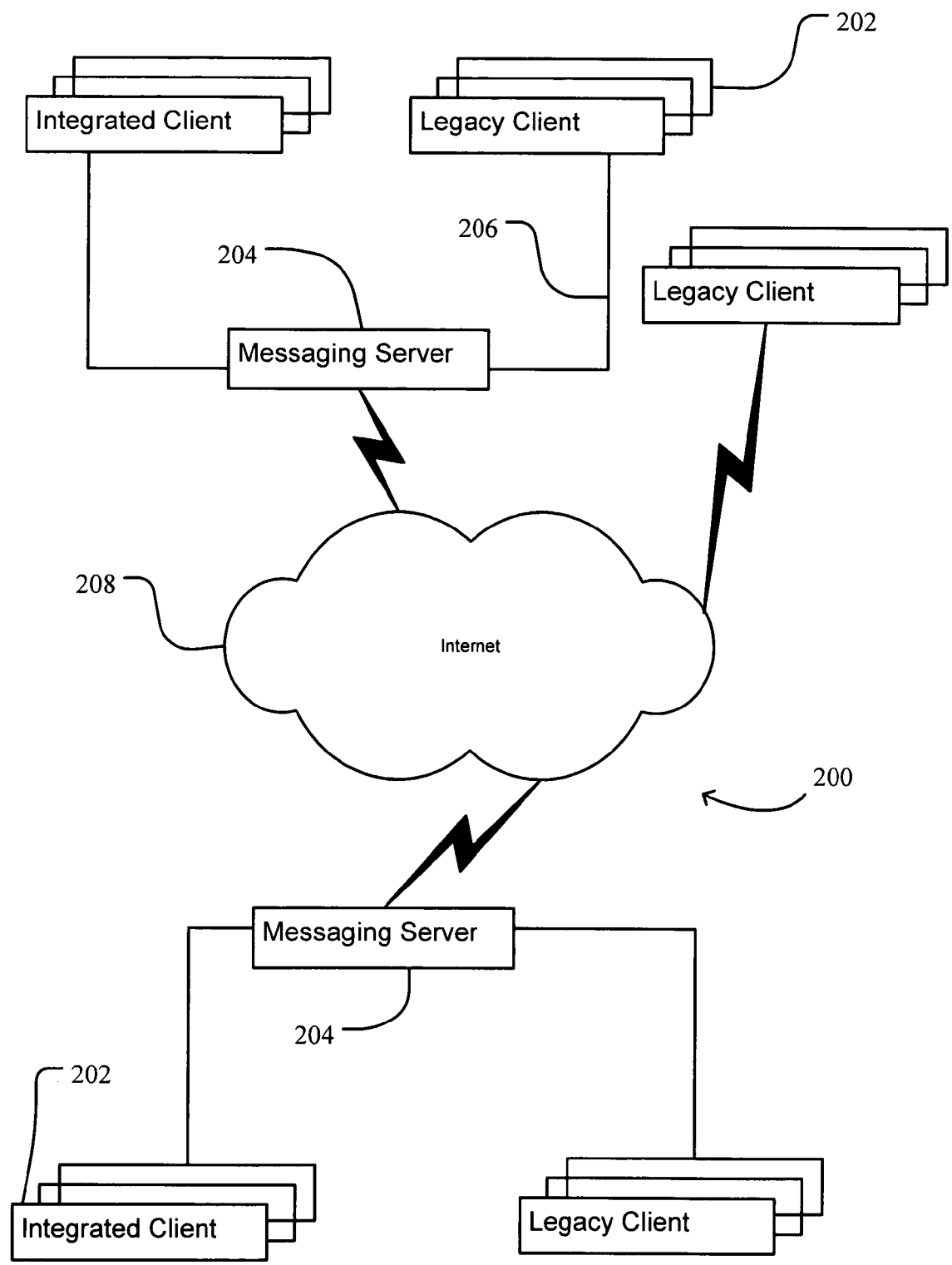
FIG. 2 is a block diagram illustrating a distributed network of client devices and messaging servers.

FIG. 2 is a block diagram illustrating one embodiment of distributed network 200 with client devices 202 and messaging servers 204. Client devices 202 may link to message servers 204 though network 206, which may be wireless or an intranet, for example. Message servers 204 may extend the capability of client devices 202 by connecting to the Internet 208.

Client devices 202 may also connect directly to the Internet, rather than connecting to the Internet through message server 204. One example of client device 202, a telephone, may connect through the public switched telephone network (PSTN) to the Internet.

Figure 3:
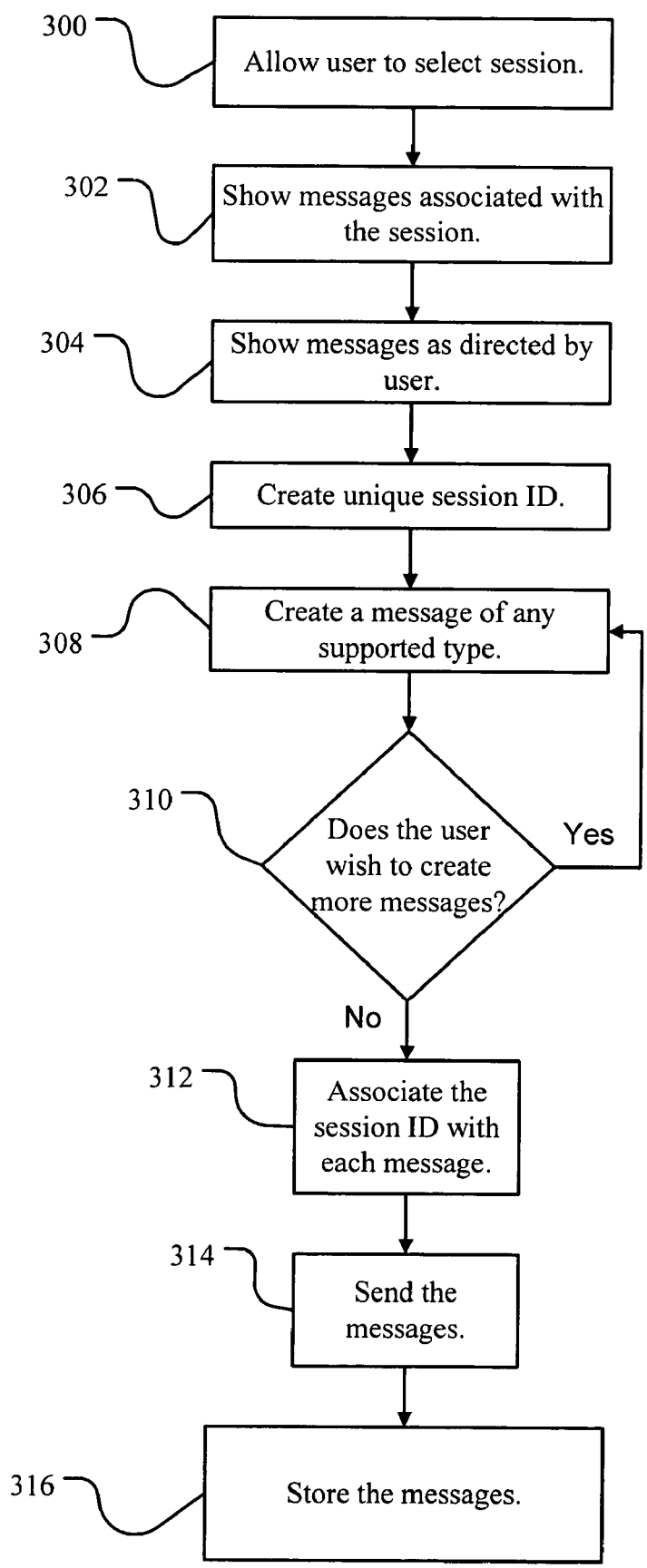
FIG. 3 is a flow diagram illustrating one method for associating messages described in conjunction with FIG. 1.

FIG. 3 is a flow diagram illustrating one method for associating related messages described in conjunction with FIG. 1. An example is helpful to understanding the invention prior to discussion of the flow diagram. In one embodiment, the invention is implemented in, for example, a mobile phone. A user initiates a session when placing a call from the phone to a friend. The friend happens to be away, so the user leaves a voicemail message. Along with the voicemail, the user wants to send an email message to the friend. A session identification (ID) is created and attached to both the email and the voicemail such that when the friend retrieves one, they will be aware of the other.

The process begins by displaying sessions from client device 102, typically categorized by session IDs, and allows the user to select a session in block 300. The sessions may be stored in client device 102 or transferred from message server 104. In one example, a user with integrated client device 102A (a mobile phone) scrolls through a list of previous sessions. The sessions may be organized or categorized in any manner desired by the user. Continuing with the above example, the user decides to select one of the sessions regarding a birthday.

After selecting a session, a user may, in block 302, show messages 113 associated with the selected session. Although messages 113 will be used in the plural in the following example, a session ID is not limited to multiple messages. Messages 113 may be stored in client device 102 (which in one embodiment functions as message server 104), or separately in message server 104. The session lists may be managed from wherever messages 113 are stored. Continuing with the example, the user is shown several messages 113 on the mobile phone screen, each related to the birthday: two email 114 messages, the presence of one voice 116 message, and one HTTP 124 link.

In block 304, a user selects one of stored messages 113 to be displayed for the user to view. Messages 113 may be edited, deleted, linked to another session (adding another session ID, so messages 113 have more than one), the session ID may be altered, and so on. In the example, the user decides not to select any of messages 113.

In block 306, the user may indicate that a new session ID be created. Alternatively, the user may create a new message but indicate that the new message belongs to a former session ID. A new session ID is not necessary for each message. Continuing with the example, the user decides not to create a new session ID because the user wants send SMS 118 message, but have SMS 118 message related to the session ID of the birthday that the user selected in block 300.

In block 308, client device 102 allows the user to create message 113 of any type supported by client device 102. Continuing with the example, the users mobile phone supports SMS 118 messages, so the user creates SMS 118 message with the mobile phone.

In block 310, the user determines whether they wish to create more messages 113. If the user does wish to create more messages 113, there is a return to block 308. Continuing with the above example, the user decides to create only one message 113, so proceeds to block 312.

In block 312, client device 102 associates the session ID (whether new or former) with each message. Continuing with the above example, the mobile phone associates SMS 118 message with the session ID for the birthday.

In block 314, the user sends the message to the recipient. Continuing with the above example, the user might press a 'send' button on their mobile phone and send SMS 118 message to the recipient, with the associated session ID for the birthday.

In block 316, message server 104 stores message 113 with the associated session ID. Finishing with the above example, a message server that stores messages 113 for the recipient (including a recipients client device, such as a mobile phone) receives SMS 118 message and stores it with the session ID for the birthday, which is also associated with other, previously received messages.

One advantage of the invention is a method and system that allows users to send multiple types of messages 113 and identify them as belonging together, regardless of the type. In the above example, a user had two email messages, one phone message, and one HTTP link, all associated with the same session ID, which would enable them to be sorted however the user wished. The user sent an SMS message with the same associated session ID, which the recipient could then group with their own messages regarding the birthday.

Figure 4A:
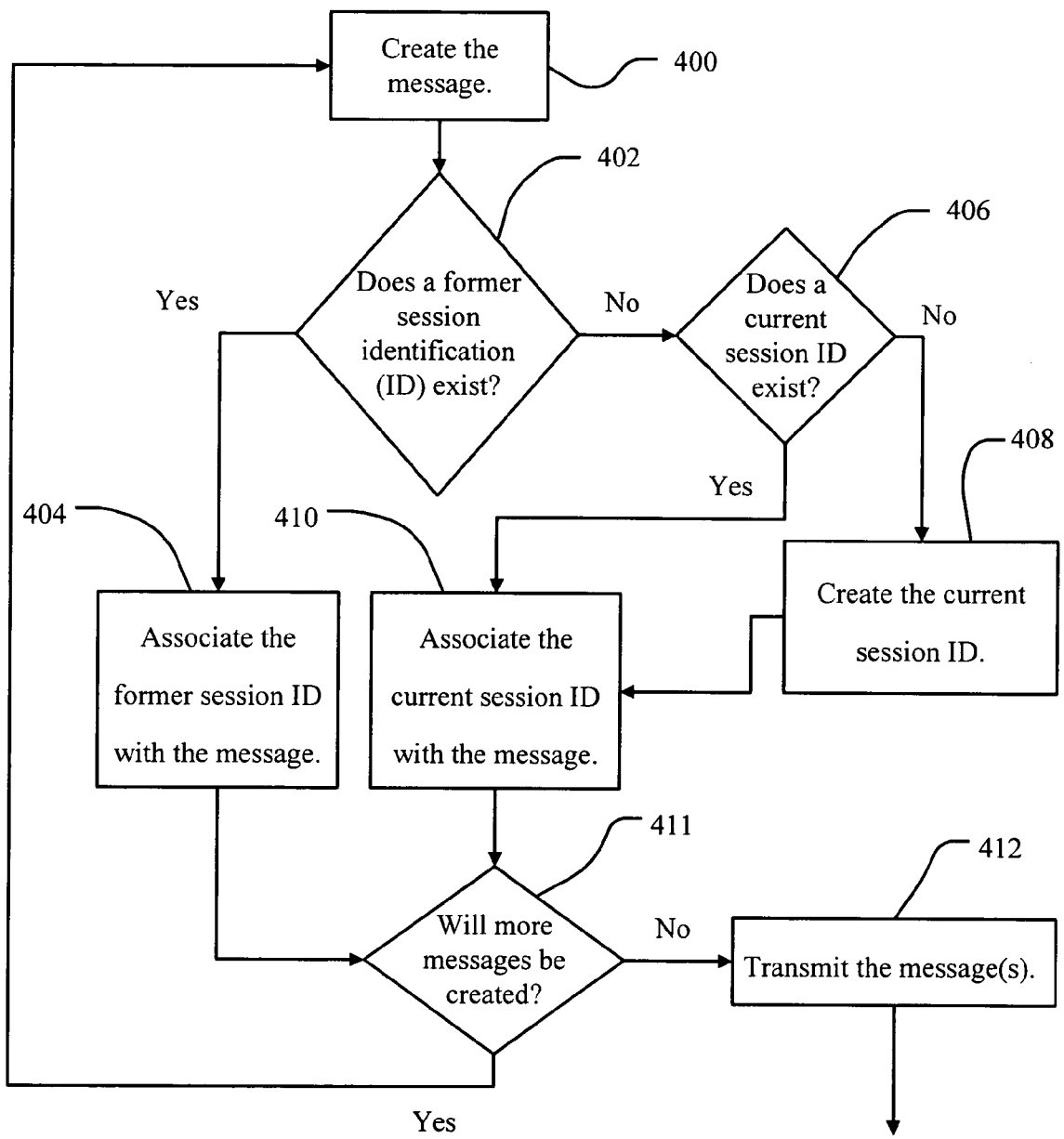
FIG. 4A is a flow diagram for illustrating one method of associating messages with respect to the system of FIG. 1.
Figure 4B:
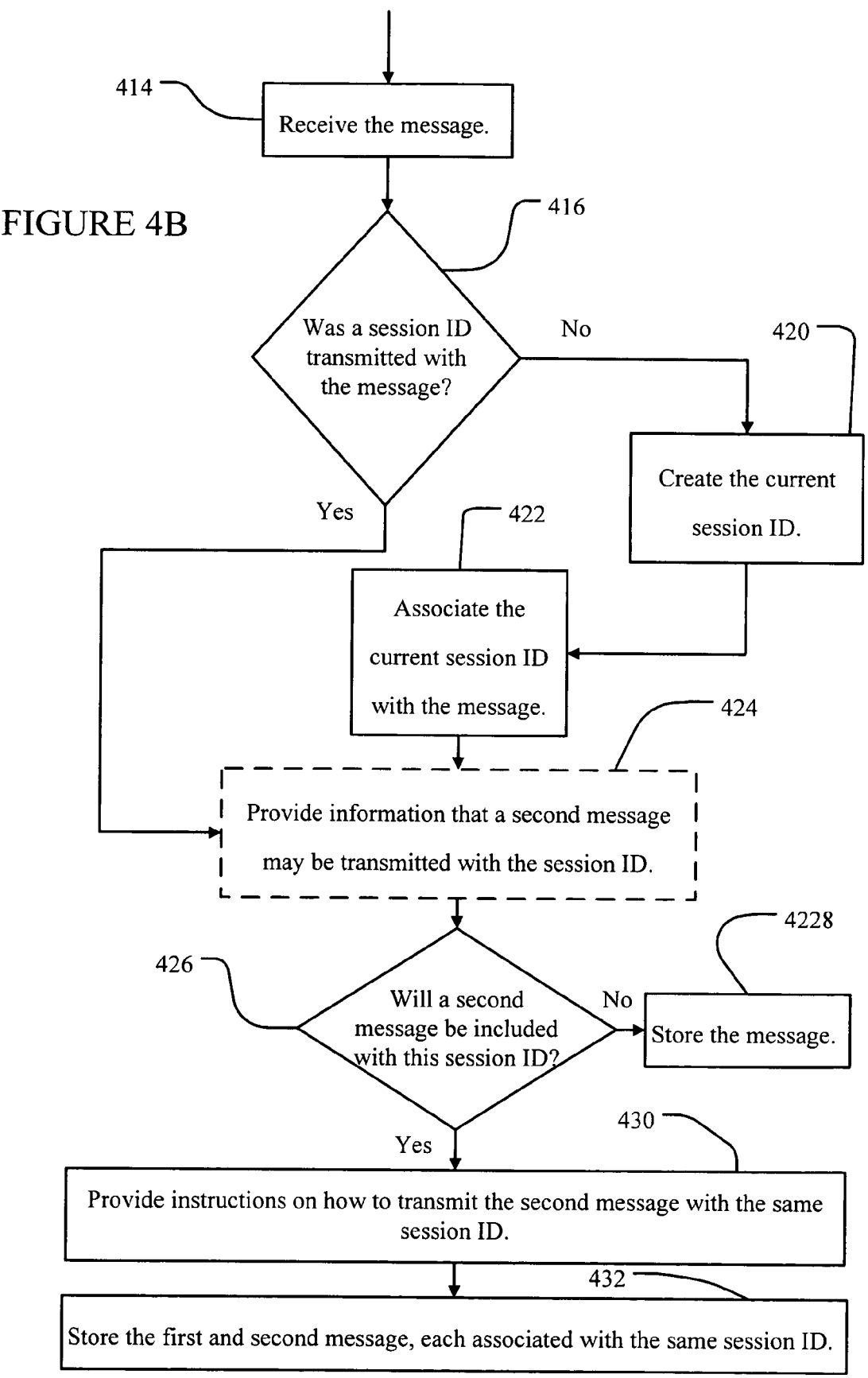
FIG. 4B is a flow diagram for illustrating one method of associating messages with respect to the system of FIG. 1.

FIGS. 4A and 4B are flow diagrams for illustrating one method of associating messages with respect to the system of FIG. 1. The following example is provided with reference to both FIGS. 1 and 2A-B. Although some similarities exist between the blocks in FIGS. 4A, 4B and 3, FIGS. 4A-B are more detailed and cover receipt of a message at a server.

The process begins in block 400 by message 113 being created in client device 102.

In block 402, client device 102 may determine whether there is a former session ID. Legacy client 102B may not be able to determine whether a former session ID exists and may need to proceed directly to block 412. However, some legacy clients 102B and integrated clients 102A will be able to determine this, and will do so in block 402 by allowing a user to select a former session.

If there is a former session ID selected by the user in block 402, then in block 404, client device 102 associates the former session ID with message 113.

If there is no former session ID selected by the user in block 402, then in block 406, client device 102 determines if a current session ID exists. A current session ID may be provided by message server 104 or another device.

Continuing from block 406, if no current session ID exists, then in block 208 client device 102 creates the current session ID. A current session ID may exist if client device 102 receives the current session ID from an outside source, or negotiates a current session ID with an outside source, for example message server 104. Otherwise, client device 102 may create a current session ID with session manager 126, for example, upon initiation of the session by the user.

If a current session ID exists, then in block 410, client device 102 associates the current session ID with message 113.

In block 411, client device 102 determines whether more messages 113 will be created. If more messages 113 will be created, return to block 400. In some client devices 102, the option to create more messages in a single session may not be available, and another session may have to be initiated (though the same session ID could be used for both).

If no more messages will be created, then in block 412, client device 102 transmits message 113 through network 106 to message server 104. Message 113 may be transmitted prior to block 411, and associated with the same session ID if it is part of the same session.

FIG. 4B is a flow diagram continuing the method illustrated in FIG. 4A with receipt of message 113 by server 104.

In block 414, message server 104 receives message 113 from one of client devices 102.

In block 416, message server 104 determines whether a former session ID or a current session ID is transmitted with message 113. The session ID may be in a subject heading or on a first line, for example, or associated in some other manner.

If client device 102 did not transmit a former or current session ID with message 113, then in block 420 message server 104 uses session manager 110 to create a current session ID.

In block 422, message server 104 uses session manager 110 to associate the current session ID with message 113. In this embodiment, message server 104 associates the current session ID.

In block 424, message server 104 may provide information that a second message, or an attachment, may be transmitted with the session ID (either former or current) of message 113. In one embodiment this information will be sent to client device 102, which does not have a session manager to coordinate sessions with message server 104.

Block 424 provides special instructions in cases where client device 102 does not have session manager 126 to associate former session IDs with current messages. In cases where client device 102 has session manager 126, multiple messages 113 may be created and sent with the same session ID and without the prompt of block 424.

In block 426, message server 104 determines whether a second message will be included with message 113. A second message may also be one of message 113, and is differentiated here for simplicity. Message server 104 may send a query to client device 102, which when answered by the user will determine the outcome of block 426. For example, a user may leave a voice mail with the message server 104. The message server 104 may prompt the user with an option to add an "attachment" to the voice message, such as an email or a file.

If no second message will be included, then in block 428, message server 104 stores message 113 in storage 108 with the associated session ID.

If a second message will be included, then in block 430, message server 104 provides instructions to client device 102 on how to transmit the second message with the session ID. Legacy client 102B, for example, may receive an email address to which a second message may be directed, whether email 114, HTTP 124, FTP 122, and so on. Integrated client 102A, for example, may have an address book with address information that is automatically retrieved by message server 104, and email 114 could automatically be generated to associate with the same session ID as voice 116 message. Legacy client 102B may be a telephone or fax machine, for example. Integrated client may be a computer, mobile phone, or PDA, for example.

In block 432, message server 104 stores message 113 and the second message, each associated with the session ID (either current or former). In this manner, dissimilar messages are associated together and may be cross-referenced, catalogued, and searched according to session ID. A session can represent a subject, a user or group of users, a time, or any other desired way of organizing media. The advantages of this system are that email, phone, HTTP links, and so on can all be cross-referenced according to an assigned session ID, and later searched or added to.

Messages 113 may then be ordered according to when they were sent, the sequence in which they were sent, while identifying all senders and recipients. A method and system according to the present invention functions with clients using separate voice and data networks as well as a common transport network. Media in different formats may be linked through association to a common session ID.

In one embodiment, if, during retrieval a user is not able to view the type of message stored, message server 104 may use conventional systems to convert a email 114, for example, to audio and played for the user. Conversely, if a user logs in with a PDA, voice 116 message may be converted to text. Otherwise, the user may be informed as to where to find the message, e.g. in email, on a web site, on a file server, etc.

A method and system for associating related media has been disclosed. Although the message server is distinguished from the client devices, one of ordinary skill in the art recognizes that a client device may include the message manager and storage of the message server and therefore replace the server. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

The invention claimed is:

1. A method for associating related messages of different types, the method comprising:
    receiving a message of a message type;
    determining whether a session identification (ID) is transmitted with the message, wherein the session ID is for associating a plurality of messages as a message grouping for associating messages of different message types, wherein the different message types are selected from the group consisting of a voice message, an email, a short messaging service (SMS) message, a multimedia messaging service (MMS) message, a file transfer protocol FTP file, and a hyper-text transfer protocol (HTTP) link;

responsive to a determination that the session ID is transmitted with the message, storing the message in association with the session ID, wherein the message is stored associated with an existing message grouping when the session ID is associated with a previously stored message and the message is stored associated with a newly created message grouping when the session ID is not associated with any previously stored message; and responsive to a determination that the session ID is not transmitted with the message, generating a new session ID and storing the message associated with a newly created message grouping.

2. The method of claim 1 wherein the session ID is created by a message server.

3. The method of claim 1 wherein the session ID is created by a client device and associated with the message by the client device.

4. The method of claim 1 wherein the message is a voice message, the method further comprising:

providing information to the client device for transmitting a second message with the session ID of the voice message; and providing instructions on how to transmit the second message with the session ID of the voice message.

5. The method of claim 4 further comprising:

storing the voice message and the second message, each associated with the session ID.

6. A computer readable medium containing programming instructions for associating related messages of different types in a system having a message server in communication with a client device over a network, the programming instructions for:

receiving a message of a message type;

determining whether a session identification (ID) is transmitted with the message, wherein the session ID is for associating a plurality of messages as a message grouping for associating messages of different message types, wherein the different message types are selected from the group consisting of a voice message, an email, a short messaging service (SMS) message, a multimedia messaging service (MMS) message, a file transfer protocol FTP file, and a hyper-text transfer protocol (HTTP) link;

responsive to a determination that the session ID is transmitted with the message, storing the message in association with the session ID, wherein the message is stored associated with an existing message grouping when the session ID is associated with a previously stored message and the message is stored associated with a newly created message grouping when the session ID is not associated with any previously stored message; and responsive to a determination that the session ID is not transmitted with the message, generating a new session ID and storing the message associated with a newly created message grouping.

7. The computer readable medium of claim 6 wherein the session ID is created by a message server.

8. The computer readable medium of claim 6 wherein the current session ID is created by a client device and associated with the message by the client device.

9. The computer readable medium of claim 6 wherein the message is a voice message, the method further comprising:

providing information to the client device for transmitting a second message with the same session ID as the voice message; and providing instructions on how to transmit the second message with the same session ID as the voice message.

10. The computer readable medium of claim 9 further comprising:

storing the voice message and the second message, each associated with the session ID.

11. A method for associating related messages of different types with a client device, the method comprising:

determining, in the client device, whether a session identification (ID) applies to a message of a message type, wherein the session ID is for associating a plurality of messages as a message grouping for associating messages of different message types, wherein the different message types are selected from the group consisting of a voice message, an email, a short messaging service (SMS) message, a multimedia messaging service (MMS) message, a file transfer protocol FTP file, and a hyper-text transfer protocol (HTTP) link;

responsive to a determination that the session ID applies to the message, transmitting the message in association with the session ID, wherein the message is transmitted associated with an existing message grouping when the session ID is associated with a previously transmitted message and the message is transmitted associated with a newly created message grouping when the session ID is not associated with any previously transmitted message; and responsive to a determination that the session ID does not apply to the message, generating a new session ID and transmitting the message associated with a newly created message grouping.

12. The method of claim 11 wherein the message is a voice message, the method further comprising:

receiving information for transmitting a second message with the session ID; and receiving instructions on how to transmit the second message with the session ID.

13. A system for associating messages of different types comprising:

a message server comprising:

a session manager configured to receive a message of a message type and determine whether a session identification (ID) is transmitted with the message, wherein the session ID is for associating a plurality of messages as a message grouping for associating messages of different message types, wherein the different message types are selected from the group consisting of a voice message, an email, a short messaging service (SMS) message, a multimedia messaging service (MMS) message, a file transfer protocol FTP file, and a hyper-text transfer protocol (HTTP) link; and a message manager configured to:

responsive to a determination that the session ID is transmitted with the message, store the message in association with the session ID, wherein the message is stored associated with an existing message grouping when the session ID is associated with a previously stored message and the message is stored associated with a newly created message grouping when the session ID is not associated with any previously stored message; and responsive to a determination that the session ID is not transmitted with the message, generate a new session ID and storing the message associated with a newly created message grouping.

14. The system of claim 13 wherein the message is a voice message, the session manager further configured to provide information for associating a second message with the session ID, and to provide instructions on how to transmit the second message with the session ID.

15. The system of claim 14, the message manager further configured to store the voice message and the second message, each associated with the session ID.

16. The system of claim 13 further comprising:
a client device coupled to the message server and configured to transmit the message.

17. The system of claim 16, the client device further configured to create the session ID and to transmit the message to the server with the session ID.

18. The system of claim 17 wherein the message is a voice message, the session manager further configured to provide information for associating a second message with the session ID, and to provide instructions on how to transmit the second message with the session ID.

19. The system of claim 18, the message manager further configured to store the voice message and the second message, each associated with the session ID 20. A client device for associating related messages of different types comprising:
a processor configured for:
determining whether a session identification (ID) applies to a message of a message type, wherein the session ID is for associating a plurality of messages as a message grouping for associating messages of different message types, wherein the different message types are selected from the group consisting of a voice message, an email, a short messaging service (SMS) message, a multimedia messaging service (MMS) message, a file transfer protocol FTP file, and a hyper-text transfer protocol (HTTP) link; and
a transmitter configured for:
responsive to a determination that the session ID applies to the message, transmitting the message in association with the session ID, wherein the message is transmitted associated with an existing message grouping when the session ID is associated with a previously transmitted message and the message is transmitted associated with a newly created message grouping when the session ID is not associated with any previously transmitted message; and
responsive to a determination that the session ID does not apply to the message, generating a new session ID and transmitting the message associated with a newly created message grouping.

21. The client device of claim 20, the processor is further configured to create the current session ID if the former session ID does not exist.

* * * * *